(12) United States Patent
Taniguchi et al.

(10) Patent No.: US 7,915,187 B2
(45) Date of Patent: Mar. 29, 2011

(54) TITANIUM CARBIDE POWDER AND TITANIUM CARBIDE-CERAMICS COMPOSITE POWDER AND METHOD FOR PRODUCTION THEREOF, AND SINTERED COMPACT FROM THE TITANIUM CARBIDE POWDER AND SINTERED COMPACT FROM THE TITANIUM CARBIDE/CERAMICS COMPOSITE POWDERS AND METHOD FOR PRODUCTION THEREOF

(75) Inventors: Yoko Taniguchi, Fukuoka (JP); Teruhisa Makino, Fukuoka (JP); Kunitaka Fujiyoshi, Fukuoka (JP); Osamu Nakano, Saga (JP); Toru Okui, Saga (JP); Yusuke Hara, Saga (JP)

(73) Assignees: Fukuoka Prefecture, Fukuoka (JP); Nippon Tungsten Co., Ltd., Fukuoka (JP)

( * ) Notice: Subject to any disclaimer, the term of this patent is extended or adjusted under 35 U.S.C. 154(b) by 351 days.

(21) Appl. No.: 11/887,172

(22) PCT Filed: Mar. 30, 2006

(86) PCT No.: PCT/JP2006/306742
§ 371 (c)(1),
(2), (4) Date: Nov. 8, 2007

(87) PCT Pub. No.: WO2006/106873
PCT Pub. Date: Oct. 12, 2006

(65) Prior Publication Data
US 2008/0280749 A1    Nov. 13, 2008

(30) Foreign Application Priority Data
Mar. 30, 2005    (JP) ................. 2005-099700

(51) Int. Cl.
*C04B 35/52*    (2006.01)
*C04B 35/56*    (2006.01)
*C04B 33/32*    (2006.01)
*C04B 33/36*    (2006.01)
*C04B 35/64*    (2006.01)
*C01B 31/30*    (2006.01)
*C01B 31/34*    (2006.01)

(52) U.S. Cl. ............. 501/87; 501/93; 423/439; 423/440; 264/624; 264/625

(58) Field of Classification Search ................. 423/439, 423/440; 501/87, 93; 427/228; 264/624, 264/625
See application file for complete search history.

(56) References Cited

U.S. PATENT DOCUMENTS

| | | | | |
|---|---|---|---|---|
| 4,622,215 A | * | 11/1986 | Janey | 423/440 |
| 5,169,808 A | * | 12/1992 | Gallo et al. | 501/87 |
| 5,523,269 A | * | 6/1996 | Morgan et al. | 501/93 |

FOREIGN PATENT DOCUMENTS

JP    61-232212    10/1986
(Continued)

OTHER PUBLICATIONS

Titanium Carbine From Carboxylic Acid Modified Alkoxides Tom Gallo, Carl Greco, Claude Peterson, Frank Cambria and Johst Burk, Akzo Chemicals Inc., 1 Livingstone Ave, Dobbs Ferry, NY 10522, USA.

*Primary Examiner* — Jerry Lorengo
*Assistant Examiner* — Noah S Wiese
(74) *Attorney, Agent, or Firm* — Jordan and Hamburg LLP

(57) ABSTRACT

Disclosed is a highly-pure fine titanium carbide powder having a maximum particle size of 100 nm or less and containing metals except titanium in an amount of 0.05 wt % or less and free carbon in an amount of 0.5 wt % or less. The powder has a NaCl-type crystal structure, and a composition represented by $TiC_xO_yN_z$, wherein X, Y and Z satisfy the relations: $0.5 \leq X \leq 1.0$; $0 \leq Y \leq 0.3$; $0 \leq Z \leq 0.2$; and $0.5 \leq X+Y+Z \leq 1.0$.) The powder is produced by: dissolving an organic substance serving as a carbon source in a solvent to prepare a liquid, wherein the organic substance contains at least one OH or COOH group which is a functional group coordinatable to titanium of titanium alkoxide, and no element except C, H, N and O; mixing titanium alkoxide with the liquid to satisfy the following relation: $0.7 \leq \alpha \leq 1.0$ (wherein $\alpha$ is a molar ratio of the carbon source to the titanium alkoxide), so as to obtain a precursor solution; and subjecting a product in the precursor solution to a heat treatment in a non-oxidizing atmosphere or a vacuum atmosphere at a temperature of 1050 to 1500° C. The present invention can provide fine titanium carbide powders with nano-scale particle sizes, which are free of inorganic impurities, such as titanium oxide and metal, low in free carbon, and effective in enhancing characteristics of a titanium carbide-ceramics composite sintered body.

31 Claims, 3 Drawing Sheets

FOREIGN PATENT DOCUMENTS

| | | |
|---|---|---|
| JP | 62-207708 | 9/1987 |
| JP | 5-270820 | 10/1993 |
| JP | 2004-323968 | 11/2004 |
| JP | 2005-047739 | 2/2005 |

\* cited by examiner

TITANIUM CARBIDE POWDER AND TITANIUM CARBIDE-CERAMICS COMPOSITE POWDER AND METHOD FOR PRODUCTION THEREOF, AND SINTERED COMPACT FROM THE TITANIUM CARBIDE POWDER AND SINTERED COMPACT FROM THE TITANIUM CARBIDE/CERAMICS COMPOSITE POWDERS AND METHOD FOR PRODUCTION THEREOF

TECHNICAL FIELD

The present invention relates to a titanium carbide powder having nanometer-scale particle sizes, a titanium carbide-ceramics composite powder, and the production methods. The present invention also relates to a sintered body using the titanium carbide powder, a sintered body using the titanium carbide-ceramics composite powder, and the production methods.

BACKGROUND ART

In many instances, titanium carbide is used in the form of a composite sintered body. Particularly, a titanium carbide and alumina composite sintered body is used in various applications, such as cutting tools, wear-resistant parts and thin-film magnetic head substrates, based on its excellent characteristics, such as high-temperature strength, heat resistance, wear resistance and chemical resistance.

On the other hand, titanium carbide has a disadvantage of poor sinterability. If titanium carbide is used as a part of a composite material to prepare a sintered body, the sintered body is highly likely to have residual voids or pores. Thus, it is necessary to add a sintering aid for increasing the degree of sintering, which leads to a problem about deterioration in strength of the sintered body.

As means for solving this problem, it is effective to decrease particle sizes of titanium carbide powders in order to improve the sinterability. If a titanium carbide powder is formed to have smaller particle sizes, it will have enhanced sinterability and can be sintered at lower temperature. This allows a grain growth of ceramics to be effectively suppressed during a process of preparing a composite sintered body in combination with ceramic powder. It is known that, when a particle size of a titanium carbide powder is reduced to 100 nm or less, the above effect can be significantly enhanced, and additionally the titanium carbide powder exhibits an excellent dispersion strengthening effect in a sintered body.

A titanium carbide powder is widely used as an addition for improving high-temperature hardness and wear-resistant characteristic in WC/Co-based hard metal cutting tools, or as an initial raw material for cermet tools, rolls and dies, in the form of a composite material combined with a metal powder, such as a Ni powder.

Recently, in view of particle-size reduction (i.e., micronization or nanonization) of titanium carbide powders which allows a tool to have higher hardness, higher transverse rupture strength and enhanced wear resistance, a particle-size reduction techniques for titanium carbide powders become a key challenge.

Heretofore, a titanium carbide powder has been produced by a process of subjecting a mixed powder of titanium dioxide ($TiO_2$) and carbon to a heat treatment in a non-oxidizing atmosphere at a high temperature of about 1500° C. to reduce/carbonize the mixed powder, or by a direct carburization process using Ti and $TiH_2$.

TiC powder produced by the above conventional processes have large particle sizes of 1 to 10 μm, and therefore the particle sizes are reduced by ball milling. However, it is difficult to reduce a maximum particle size to 0.5 μm or less. Moreover, grinding media are inevitably mixed in the powder to cause deterioration in powder quality.

With a view to solving these problems, the following Patent Publication 1 discloses a technique of putting a mixed solution of titanium tetrachloride ($TiCl_4$) and carbon chloride into a closed container containing molten magnesium (Mg) metal under an inert atmosphere, vacuum-separating excess liquid Mg and magnesium chloride ($MgCl_2$) remaining after a magnesium reduction reaction, and collecting a TiC-base composite from the closed container after the vacuum separation of the liquid Mg and the $MgCl_2$.

Based on the technique disclosed in the Patent Publication 1, a titanium carbide powder can be synthesized at a temperature of 900 to 1000° C. which is lower than ever before. In addition, the obtained titanium carbide powder has a fine particle size of 50 nm, and contains free carbon in a small amount of 0.2 weight %, with a titanium-carbide crystal structure having a lattice constant of 4.3267 Å which is close to a theoretical value.

However, the above titanium carbide powder involves a problem about a large content of impurities, specifically, 0.3 to 0.8 wt % of Mg, 0.1 to 0.3 wt % of Cl and 0.1 to 0.6 wt % of Fe.

The following Patent Publication 2 discloses a technique of: the mixture of water-soluble salt which contains a titanium, one of a metatitanic acid [$TiO(OH)_2$] slurry or an ultrafine titanium oxide powder, and solution which dissolved water-soluble metal salt which contains a transition metal in water were prepared as a mixed raw material; spray-drying the mixed raw material to obtain a precursor powder; subjecting the precursor powder to a heat treatment to form an ultrafine Ti-transition metal composite oxide powder; mixing nanosized carbon particles with the ultrafine Ti-transition metal composite oxide powder; drying the mixture to obtain a composite oxide powder; subjecting the composite oxide powder to a reduction treatment in a non-oxidizing atmosphere and a carburization heat treatment at 1200 to 1350° C. to produce a TiC—Co composite powder in which a titanium carbide crystal has grain sizes of 35 to 81 nm.

Although the technique disclosed in the Patent Publication 2 is designed to set a content of transition metal at 1 wt % or more so that the reduction/carburization heat treatment can be performed at a temperature of 1350° C. or less to obtain an ultrafine powder, it is difficult to produce only a highly-pure fine titanium carbide powder in a non-composite form.

Meanwhile, a synthesis of titanium carbide using a liquid phase synthesis has advantages of being able to stably obtain a fine carbide, and easily mix with other component.

Further, titanium alkoxide used as a titanium source provides an advantage of allowing a titanium carbide powder with an extremely small amount of other mixed metal component to be obtained at relatively low cost.

However titanium carbide powder got by the liquid-phase method reported until now contained free carbon over several wt % or more as impurities, when it was used as a sintering raw material, the free carbon would disturb sintering to cause a problem about difficulty in obtaining a dense sintered body.

For example, the following Non-Patent Publication 1 discloses a technique of mixing titanium isopropoxide with several types of dicarboxylic acids having different chelation properties drying the mixture, and subjecting the dried product to a heat treatment in an argon atmosphere containing 0 to 10% of hydrogen to obtain a titanium carbide powder. However, the obtained titanium carbide powder contains free carbon in an amount of 4.2 wt % or more.

As above, no mass production technology has been established that is capable of producing a titanium carbide powder which has a maximum particle size of 100 nm or less, and contains free carbon in an amount of 0.5 wt % or less and metals except titanium in a small amount.

In a process of preparing a composite sintered body of titanium carbide and other ceramics including alumina, if a titanium carbide powder as a raw material has a smaller particle size, it is more likely to aggregate and thereby cause difficulty in obtaining a sintered body with titanium carbide grains homogeneously dispersed therein.

As a technique of solving this problem, in a process of preparing a titanium carbide-dispersed ceramics sintered body, powder particles each having a so-called core-shell structure where a surface of each ceramics particle is covered with titanium carbide particles, are effective in preventing aggregation of a titanium carbide powder so as to obtain the sintered body with a homogenous structure. The core-shell particles are also effective in suppressing grain growth of ceramics during sintering.

The following Patent Publication 3 discloses one production method for such a composite powder. The method disclosed in the Patent Publication 3 comprises synthesizing powder particles with a core-shell structure where a TiC thin film is formed on a surface of each alumina particle by a CVD (Chemical Vapor Deposition) process, and sintering the powder to obtain a sintered body with titanium carbide grains homogeneously dispersed therein. However, the CVD process is originally a batch production process to be performed in a vacuum apparatus, which is unsuitable for mass production and costly.

[Patent Publication 1] JP 2005-047739A
[Patent Publication 2] JP 2004-323968A
[Patent Publication 3] JP 05-270820A
[Non-Patent Publication 1] Tom Gallo, Carl Greco, Claude Peterson, Frank Cambira and Johst Burk, Azko Chemicals Inc., Mat. Res. Soc. Symp. Proc. Vol. 271, 1992, pp 887-892

DISCLOSURE OF THE INVENTION

Problems that the Invention is to Solve

In view of the above problems in producing a fine titanium carbide powder having a nanometer-scale particle size, and a sintered body using the fine titanium carbide powder, it is an object of the present invention to provide a fine titanium carbide powder which is free of inorganic impurities, such as titanium oxide and metal, low in free carbon, and effective in enhancing characteristics of a titanium carbide-ceramics composite sintered body.

It is another object of the present invention to provide a titanium carbide-ceramic composite powder capable of being prepared by mixing a ceramic powder, and a fine titanium carbide powder which is free of inorganic impurities, such as titanium oxide and metal, and low in free carbon, to allow a titanium carbide-ceramic composite material to be relatively easily obtained.

It is yet another object of the present invention to provide the titanium carbide-ceramics composite powder in a specific type which comprises powder particles with a core-shell structure where a surface of each ceramics particle is covered with titanium carbide particles (this composite powder will hereinafter be referred to as "core-shell type composite powder").

It is still another object of the present invention to provide a sintered body having fine titanium carbide grains homogenously dispersed in a matrix of ceramics, using the titanium carbide-ceramics composite powder or the core-shell type composite powder.

It is yet still another object of the present invention to provide a method of producing the fine titanium carbide powder having a nanometer-scale particle size, with excellent mass productivity.

It is another further object of the present invention to establish optimal conditions for mass-producing the titanium carbide powder by a liquid-phase synthesis.

It is still a further object of the present invention to provide a method of producing the titanium carbide-ceramics composite powder by a liquid-phase synthesis, with excellent mass productivity.

It is an additional object of the present invention to provide a method of producing the core-shell type composite powder, with excellent mass productivity.

It is yet an additional object of the present invention to establish optimal conditions for mass-producing the core-shell type composite powder, by a liquid-phase synthesis.

It is other object of the present invention to provide a method of producing the sintered body having fine titanium carbide grains homogenously dispersed in ceramics, using the titanium carbide-ceramics composite powder or the core-shell type composite powder.

Means for Solving the Problems

In order to achieve the above objects, the present invention provides a highly-pure fine titanium carbide powder which has a maximum particle size of 100 nm or less, and contains metals except titanium in an amount of 0.05 wt % or less and free carbon in an amount of 0.5 wt % or less.

If the maximum particle size of the titanium carbide powder becomes larger than 100 nm, the dispersion strengthening effect for suppressing grain growth in ceramics during a process of producing a sintered body cannot be sufficiently obtained, and pores will undesirably remain in the ceramics to cause deterioration in strength of the sintered body.

If metal components as impurities are contained in an amount of larger than 0.05 wt %, metal components will be changed to a liquid phase during the sintering process to form a weak sites which undesirably cause significant deterioration in strength of the sintered body.

If free carbon is contained in the titanium carbide powder, the free carbon will disturb sintering of the titanium carbide powder during the sintering process to preclude the sintered body from being obtained in a desired density. Moreover, the free carbon causes the occurrence of pores. In particular, if the free carbon is contained in an amount of larger than 0.5 wt %, the sintered body will have a relative density of less than 99% to undesirably cause significant deterioration in mechanical strength of the sintered body.

It is desirable to minimize the content of free carbon in the titanium carbide powder. The free carbon content may be reduced by adding/mixing a titanium dioxide ($TiO_2$) powder to/with the titanium carbide powder obtained by the present invention, and subjecting the mixture to a heat treatment in a non-oxidizing atmosphere to produce a reaction between the titanium dioxide and the free carbon. In this case, the free carbon is removed in such a manner as to be incorporated into the titanium dioxide as a solid solution or vaporized as CO gas.

Preferably, the titanium carbide powder of the present invention has a NaCl-type crystal structure, and a composition represented by TiCxOyNz, wherein X, Y and Z satisfy the following relations: $0.5 \leq X \leq 1.0$; $0 \leq Y \leq 0.3$; $0 \leq Z \leq 0.2$; and $0.5 \leq X+Y+Z \leq 1.0$. If the titanium carbide powder does not satisfy the relation "$0.5 \leq X \leq 1.0$", the NaCl-type crystal structure cannot be maintained, the powder is not desirable. If Y in the titanium carbide powder is greater than 0.3, the aforementioned grain-growth suppressing effect cannot be sufficiently obtained, and a sintered body to be obtained will be adversely effected in terms of heat conductivity and machinability. If Z in the titanium carbide powder is greater than 0.2, the machinability of the sintered body will be more adversely effected as compared with oxygen.

The present invention also provides a titanium carbide-ceramics composite powder which comprises particles each having a core-shell structure in which each ceramic particle is covered with particles of the above highly-pure fine titanium carbide powder. This core-shell type composite powder can suppress grain growth in ceramics during sintering to facilitate obtaining the titanium carbide-ceramics composite sintered body with fine titanium carbide grains homogeneously dispersed in a fine structure of ceramics. In addition, based on the fine dispersion effect, the titanium carbide-ceramics composite sintered body can have a fine structure which has been hardly achievable by conventional production processes, to obtain enhanced strength, fracture toughness and hardness.

When a mixing ratio of the titanium carbide powder to the ceramic powder is set at a high value, it is not possible that all titanium carbide powder cover respective surfaces of the ceramic particles. Specifically, a part of the titanium carbide powder particles cover respective surfaces of the ceramic particles, and the remaining titanium carbide powder particles are dispersed in a matrix of the ceramics. Thus, this titanium carbide-ceramics composite powder (hereinafter referred to as "dispersion type composite powder) can have the same fine dispersion effect as that of the above core-shell type composite powder.

In the above titanium carbide-ceramics composite material (i.e., core-shell type and dispersion type composite powders, titanium carbide-coated alumina powders are suitably used in a wide range of applications, such as cutting tools, wear-resistant parts and thin-film magnetic head substrates.

Further, the present invention provides a method of producing the highly-pure fine titanium carbide powder which has a maximum particle size of 100 nm or less and contains metals except titanium in an amount of 0.05 wt % or less and free carbon in an amount of 0.5 wt % or less. The method comprises the steps of: dissolving an organic substance serving as a carbon source in a solvent to prepare a liquid, wherein the organic substance contains at least one OH or COOH group which is a functional group coordinatable to titanium of titanium alkoxide, and no element except C, H, N and O; mixing titanium alkoxide with the liquid to satisfy the following relation: $0.7 \leq \alpha \leq 1.0$ (wherein $\alpha$ is a molar ratio of the carbon source to the titanium alkoxide), so as to obtain a solution, i.e., a precursor solution; drying the precursor solution according to need to obtain a product; and subjecting the product to a heat treatment in a non-oxidizing atmosphere or a vacuum atmosphere at a temperature of 1050 to 1500° C.

In the above method, the organic substance having ligands coordinatable to titanium of titanium alkoxide is used as the carbon source to substitute the functional group of the carbon source for ligands existing in the titanium alkoxide so as to provide a molecularly homogenous composition of the carbon source and the titanium source. This homogenous composition makes it possible to allow a temperature of a subsequent carbonization reaction to be drastically lowered, so that the growth of the titanium carbide particles can be suppressed to obtain fine particles having a maximum particle size of 100 nm or less.

In the liquid phase reaction, catalyst containing metal is not used and high-purity titanium alkoxide is used as titanium source. Thus, an amount of metal impurities can be limited to 0.05 wt % or less.

In the molecularly homogenous composition of the carbon source and the titanium source, the carbon source does not exist locally, and therefore an amount of carbon source never becomes insufficient for the titanium source. Thus, except titanium carbide, any substance, such as titanium oxide, will not be produced.

When an amount of titanium alkoxide to be mixed with the liquid prepared by dissolving the organic substance serving as a carbon source in a solvent is appropriately set in the above manner, a titanium carbide material containing free carbon in an amount of 0.5 wt % or less can be obtained. For example, if the mixing ratio of the carbon source to the titanium source is set at an excessively high value, a large amount of free carbon will be undesirably produced. If the mixing ratio of the carbon source to the titanium source is set at an excessively low value, a substance other than a titanium carbide group will be undesirably produced.

The functional group of the carbon source comprises OH group or COOH group which capable of easily forming a coordinate bond. For example, the carbon source includes: phenols including phenol and catechol; novolac-type phenolic resin; organic acid including salicylic acid, phthalic acid, catechol and anhydrous citric acid; and ethylenediaminetetraacetic acid (EDTA). These organic compounds may be used independently or may be used as a combination of two or more of them. However, the use of a carbon source containing an element other than C, H, N and O is undesirable, because such an element is likely to be left as impurities.

In view of reducing a maximum particle size to 100 nm or less, the carbonization temperature is set in the range of 1050 to 1500° C. If the carbonization temperature is below 1050° C., a time required for carbonization will be excessively extended to cause deterioration in productivity. If the carbonization temperature is above 1500° C., the growth of titanium carbide particles will be significantly accelerated, and finally the maximum particle size will be increased up to larger than 100 nm.

Preferably, an organic substance having two or more ligands and a cyclic compound is used as the carbon source. When the ligand is two or more multidentate ligands, the carbon source can form chelate bonds to titanium so as to be stronger coordinated to the titanium as compared with a compound with a unidentate ligand. Thus, the carbon source can be highly homogenously mixed with the titanium source without uneven distribution. This is effective in reducing the amount of free carbon. In addition, the cyclic compound has a high carbon ratio which remains as carbon after the heat treatment, and therefore allows a required amount of carbon source to be reduced so as to contribute to effective reduction in cost.

Even after the precursor solution is heated and dried, the carbon source firmly coordinatable to titanium can maintain the coordination state. Thus, in the product, the carbon source is highly homogenously mixed with the titanium source without uneven distribution, and the amount of free carbon is effective reduced.

Preferably, the titanium alkoxide serving as the titanium source includes titanium (IV) methoxide, titanium (IV) ethoxide, titanium (IV) isopropoxide and titanium (IV)

butoxide. Among them, the titanium (IV) isopropoxide is particularly preferable in view of cost and handleability.

The production method for the fine titanium carbide powder can be applied to a method of producing a mixed powder with a ceramic powder, such as alumina, other oxide, nitride or boride.

In this case, ceramic powder is mixed with a precursor solution which is a molecularly homogenous composition of carbon source and titanium source, to slurry the precursor solution. Then, organic solvent is removed from the slurry to obtain a core-shell type powder where a surface of each ceramic particle is covered with a product obtained by drying the precursor solution, or a dispersion type composite powder. Then, the core-shell type or dispersion type composite powder is subjected to a heat treatment in a non-oxidizing atmosphere or a vacuum atmosphere.

In this production method, a molar ratio "$\alpha$" of the carbon source to the titanium alkoxide is set to satisfy the following relation: $0.75 \leq \alpha \leq 1.1$, so as to obtain a titanium carbide-ceramics composite powder containing free carbon in an amount of 0.5 wt % or less. That is, the molar ratio of the carbon source to the titanium alkoxide is required to be set at a value higher than that in the production method for only the titanium carbide. The reason is that the ceramic powder slightly disturbs the carbonization reaction in the homogenous composition of the carbon source and the titanium source.

The core-shell type or dispersion type composite powder can be subjected to a hot pressing process in a vacuum atmosphere or a nitrogen or argon atmosphere, at a press temperature of 1400 to 1850° C. and a press pressure of 10 to 50 MPa, so as to obtain a fine titanium carbide-dispersed ceramic sintered body suppressed grain growth.

If the press temperature is below 1400° C., the composite powder will not be sufficiently sintered to cause undesirable residual pores. If the press temperature is above 1850° C., the grain-growth suppressing effect will not be obtained to cause grain growth of ceramic.

If the press pressure is lower than 10 MPa, the composite powder will not be sufficiently sintered to cause undesirable residual pores. If the press pressure is higher than 50 MPa, the need for increasing the strength of a mold and/or a punch will undesirably arise.

Alternatively, the core-shell type or dispersion type composite powder may be formed into a powder compact, and the powder compact may be sintered in a vacuum atmosphere or a nitrogen or argon atmosphere, at a temperature of 1500 to 1900° C.

If the sintering temperature is below 1500° C., the composite powder will not be sufficiently sintered to cause undesirable residual pores. If the sintering temperature is above 1900° C., the grain-growth suppressing effect will not be obtained to cause grain growth of ceramic.

The titanium carbide-ceramics composite sintered body obtained by subjecting the core-shell type or dispersion type composite powder to the hot pressing process or the forming/sintering process to have a relative density of 95% or more may further be subjected to a hot isostatic pressing (HIP) process in a nitrogen or argon atmosphere, at a temperature of 1400 to 1600° C. and a pressure of 50 to 200 Mpa, so as to obtain a fine titanium carbide-dispersed ceramic sintered body without residual pores.

If the HIP temperature is below 1400° C., an HIP effect will not be sufficiently obtained to cause undesirable residual pores. If the HIP temperature is above 1600° C., the grain-growth suppressing effect will not be obtained to cause grain growth of ceramic.

If the HIP pressure is lower than 50 MPa, the HIP effect will not be sufficiently sintered to cause undesirable residual pores. If the HIP pressure is higher than 200 MPa, the need for increasing the strength of an HIP apparatus will undesirably arise.

In the method of producing the fine titanium carbide-dispersed ceramic sintered body, it is not essential to once dry the slurry obtained by mixing a ceramic powder with the precursor solution which is a mixed solution of the carbon source, the organic solvent and the titanium alkoxide. That is, the slurry may be solidified through gelation, and the solidified product may be subjected to a carbonization and sintering.

Effect of the Invention

As above, in the present invention, a liquid-phase synthesis having excellent mass productivity as compared with a gas-phase synthesis is employed as means for synthesizing a fine titanium carbide powder having a nanometer-scale particle size. By replacing the ligand/ligands of the titanalkoxide with functional group/groups of carbon source in the liquid phase, this makes stable coordination state so as to prevent formation of titanium oxides and mixing of other metal components as impurities.

An amount of free carbon which is not bonded to titanium can be significantly reduced by controlling a structure and amount of the functional group of the carbon source, and a substitution reaction between the functional group/groups and the ligand/ligands of titanium source.

Titanium and carbon are bonded to each other on a molecular level. Thus, the carbonization reaction can be performed at a drastically lowered temperature to suppress growth of the titanium carbide particles so as to obtain a fine high-quality titanium carbide powder.

The production method for the fine highly-pure titanium carbide powder can be applied to the production of a titanium carbide-ceramic composite powder so as to obtain a core-shell type composite powder. This core-shell type composite powder can be sintered while suppressing grain growth of ceramic to obtain a titanium carbide-dispersed high-density sintered body optimally usable in cutting tools, wear-resistant parts, thin-film magnetic head substrates or the like.

Particularly, in the titanium carbide-dispersed alumina-based composite material using the titanium carbide powder having a maximum particle size of 100 nm or less of the present invention, based on the grain-growth suppressing effect of the titanium carbide particles in alumina matrix, alumina crystals has smaller grain sizes than ever before, to facilitate sintering even in contact points with titanium carbide particles so as to prevent the occurrence of micro pores.

The sintered body having such a nanostructure has excellent machinability for mirror like finishing to facilitate obtaining an optical mirror surface (Rtm: 5 nm or less), and allows a polishing rate to be increased so as to contribute to increase in production efficiency. Further, this sintered body can obtain excellent surface roughness through ion machining (reactive ion etching or ion beam etching).

The sintered body is excellent in strength and fracture toughness (resistance to crack formation/propagation), and free of the occurrence of cracks and the pull-out of particles during machining. The sintered body is also excellent in terms of purity, and optimally usable as a material of thin-film magnetic head substrates. In a thin-film magnetic head using this sintered body, machining conditions in a production process thereof can be optimized to suppress the occurrence of cracks and the pull-out of particles at an end of a thin-film magnetic head slider so as to ensure high reliability as a thin-film magnetic head.

The sintered body of the present invention has fine titanium carbide grains. Thus, even if a content of titanium carbide is in the range of 10 to less than 30 wt % which is less than that (30 to 40 wt %) of a conventional substrate material, mechanical and machining properties equivalent or superior to those of the conventional substrate material can be obtained to ensure reduction in weight and increase in heat conductivity of the thin-film magnetic head slider.

BEST MODE FOR CARRYING OUT THE INVENTION

An embodiment of the present invention will now be described based on examples.

Example 1

20 g of salicylic acid having a molecular mass of 138.1 serving as a carbon source was added to 60 ml of 2-methoxyethanol serving as a solvent, and the mixture was stirred to dissolve the carbon source in the solvent so as to obtain transparent and colorless liquid serving as raw material of precursor.

46.4 g of titanium isopropoxide which has titanium content of about 7.8 g and molecular mass of 284.2, and is in liquid form at room temperature, was added to the liquid, and the mixture was stirred to obtain a highly-transparent homogenous reddish brown composition having salicylic acid substituted and coordinated for/to a part of titanium isopropoxide. The mixture was successively stirred for 2 hours, and then heated with stirring in an oil bath to obtain a dried product. This dried product has an orange color, and a molar ratio "α" of salicylic acid serving as a carbon source to titanium isopropoxide serving as a titanium source of 0.9.

Then, in a graphite crucible having an inner diameter of 200 mm and a height of 80 mm, the obtained dried product was subjected to a heat treatment which comprises heating the dried product up to a maximum treatment temperature of 1050 to 1500° C. under a vacuum atmosphere of 13.33 Pa (0.1 Torr), holding the maximum treatment temperature for 4 hours, and naturally cooling the heated product, to obtain a composition.

FIG. 1 shows an X-ray powder diffraction measurement result on the composition obtained at a treatment temperature of 1350° C.

In view of the result, it was clear that the obtained composition is single-phase titanium carbide without containing crystalline impurities, such as titanium oxide. The synthesized titanium carbide has a lattice constant of 4.327 Å.

FIG. 2 shows a transmission electron microscope (TEM) photograph of the obtained titanium carbide powder. Based on the photograph, it was proven that the titanium carbide powder has a maximum particle size of 100 nm or less. As a result of measurement based on a carbon-sedimentation/separation/combustion/infrared adsorption spectroscopy, a content of free carbon in the obtained titanium carbide powder was 0.07 wt %.

As a result of measurement based on a calibration curve method in fluorescent X-ray spectroscopy, an amount of metal except titanium, in the obtained titanium carbide powder, was 0.02 wt %.

Example 2

62 g of salicylic acid serving as a carbon source was added to 170 ml of 2-methoxyethanol serving as solvent, and the mixture was stirred to dissolve the carbon source in the solvent so as to obtain a transparent and colorless liquid serving as raw material of precursor.

130 g of titanium isopropoxide which has titanium content of about 22 g and is in liquid form at room temperature, was added to the liquid, and the mixture was stirred to obtain a highly-transparent homogenous reddish brown composition having salicylic acid substituted and coordinated for/to a part of titanium isopropoxide. The mixture was successively stirred for 2 hours, and then 46 g of alumina powder was added to the mixture. The obtained mixture was stirred using a stirrer for 3 hours, and then heated with stirring in an oil bath to obtain a dried product. This dried product has an orange color, and a molar ratio "α" of salicylic acid serving as the carbon source to titanium isopropoxide serving as a titanium source of 1.0.

Then, in a graphite crucible having an inner diameter of 200 mm and a height of 80 mm, the obtained dried product was subjected to a heat treatment which comprises heating the dried product up to a maximum treatment temperature of 1050 to 1500° C. under a vacuum atmosphere of 13.33 Pa (0.1 Torr), holding the maximum treatment temperature for 4 hours, and naturally cooling the heated product, to obtain a composition.

FIG. 3 shows an X-ray powder diffraction measurement result on the composition obtained at a treatment temperature of 1350° C.

In view of the result, it was clear that the obtained composition consists only of titanium carbide and alumina without containing crystalline impurities, such as titanium oxide. The synthesized titanium carbide has a lattice constant of 4.329 Å.

FIG. 4 shows a transmission electron microscope (TEM) photograph of the obtained titanium carbide-alumina composite powder. Based on the photograph, it was proven that an alumina particle was covered with titanium carbide particles, and the titanium carbide particles have a maximum particle size of 100 nm or less. As a result of measurement based on a carbon-sedimentation/separation/combustion/infrared adsorption spectroscopy, a ratio of free carbon to titanium carbide in the obtained composition was 0.03 wt %.

Example 3

The titanium carbide-covered alumina powder obtained in Example 2 was put in a carbon mold, and subjected to a hot pressing process under an argon atmosphere at a press pressure of 25 MPa and a press temperature of 1800° C. for 90 minutes, to obtain a sintered body having a length of 50 mm, a width of 50 mm and a thickness of 4 mm. A density of the sintered body was measured by an Archimedes' method. As a result, it was proven that the sintered body has a density of $4.27 \times 10^3$ kg/m$^3$, and a relative density of 99.5%.

Then, the sintered body was subjected to surface polishing, and then subjected to mirror-like finishing based on lapping using a tin plate. The finished sintered body was observed using a scanning electron microscope (SEM).

FIG. 5 shows a SEM photograph of a mirror-finished surface of the obtained alumina-titanium carbide composite sintered body. As seen in this photograph, titanium carbide particles are homogenously distributed in the sintered alumina. In addition, any pore due to free carbon and other was not observed.

Table 1 shows a comparison between inventive samples and comparative samples. In the comparative samples 1 and 3, the molar ratio "α" of the carbon source to the titanium source is not set at an adequate value, which results in an extremely large amount of free carbon. In the comparative samples 2 and 4, the molar ratio "α" of the carbon source to the titanium source is not set at an adequate value, and thereby no TiC phase is observed.

TABLE 1

| | Carbon Source | Color of Precursor Solution | Color of Dried Powder | Carbon Source/ Titanium Source (Molar Ratio) α | Presence of TiC Phase | Addition of Alumina Powder | Lattice Constant of TiC | Maximun Particle Size of TiC based on TEM Observation (nm) | Free Carbon Amount (wt %) |
|---|---|---|---|---|---|---|---|---|---|
| Inventive Sample 1 | salicylic acid | reddish brown | orange | 0.9 | YES | NO | 4.327 | 40 | 0.07 |
| Inventive Sample 2 | salicylic acid | reddish brown | orange | 1.0 | YES | YES | 4.329 | 40 | 0.03 |
| Inventive Sample 4 | salicylic acid | reddish brown | orange | 1.0 | YES | NO | 4.327 | 60 | 0.1 |
| Inventive Sample 5 | salicylic acid | orange | orange-yellow | 0.70 | YES | NO | 4.310 | 50 | 0.06 |
| Inventive Sample 6 | salicylic acid | reddish brown | orange | 1.1 | YES | YES | 4.329 | 55 | 0.05 |
| Inventive Sample 7 | salicylic acid | orange | orange-yellow | 0.75 | YES | YES | 4.325 | 50 | 0.03 |
| Comparative Sample 1 | salicylic acid | reddish brown | orange | 1.1 | YES | NO | 4.327 | 65 | 0.96 |
| Comparative Sample 2 | salicylic acid | yellow | yellow | 0.55 | NO | NO | — | — | — |
| Comparative Sample 3 | salicylic acid | reddish brown | orange | 1.2 | YES | YES | 4.325 | 60 | 0.92 |
| Comparative Sample 4 | salicylic acid | yellow | yellow | 0.55 | NO | YES | — | — | — |

For reference, Table 2 shows one example of relative densities of sintered bodies obtained by subjecting inventive titanium carbide-covered alumina powders different in free carbon amount to a hot pressing process under an argon atmosphere at a press pressure of 30 MPa and a press temperature of 1800° C. for 90 minutes.

TABLE 2

| Free Carbon Amount (wt %) | Relative Density (%) |
|---|---|
| 0.1 | 99.4 |
| 0.3 | 99.3 |
| 0.5 | 99.0 |
| 0.7 | 98.1 |
| 1.0 | 97.3 |

Table 3 shows one example of particle sizes of inventive titanium carbide-covered alumina powders different in X, Y and Z values of the titanium carbide TiCxOyNz, and heat conductivities of sintered bodies obtained by subjecting the respective powders to the hot pressing process.

TABLE 3

| X | Y | Particle Size (nm) | Heat Conductivity (W/m · k) |
|---|---|---|---|
| 0.9 | 0.1 | 20 | 24.0 |
| 0.8 | 0.2 | 30 | 23.6 |
| 0.7 | 0.3 | 70 | 22.1 |
| 0.6 | 0.4 | 110 | 20.1 |
| 0.5 | 0.5 | 130 | 18.4 |

Note) Respective values of X and Y was set as shown in Table 3, wherein Z=0.

The values of X, Y and Z were determined based on C analysis (infrared absorption method), N and O analysis and an X-ray diffraction method.

Table 4 shows one example of cutting loads of sintered bodies obtained by subjecting inventive titanium carbide-covered alumina powders different in X, Y and Z values of the titanium carbide TiCxOyNz, to the hot pressing process, wherein the cutting load means a load of a diamond blade used for cutting each of the obtained sintered bodies.

TABLE 4

| X | Z | Cutting Load (W) |
|---|---|---|
| 1 | 0 | 200 |
| 0.9 | 0.1 | 230 |
| 0.8 | 0.2 | 270 |
| 0.7 | 0.3 | 350 |
| 0.5 | 0.5 | 450 |

Note) Respective values of X and Z was set as shown in Table 4, wherein Y=0.

The values of X, Y and Z were determined based on C analysis (infrared absorption method), N and O analysis and an X-ray diffraction method.

Figure 1:
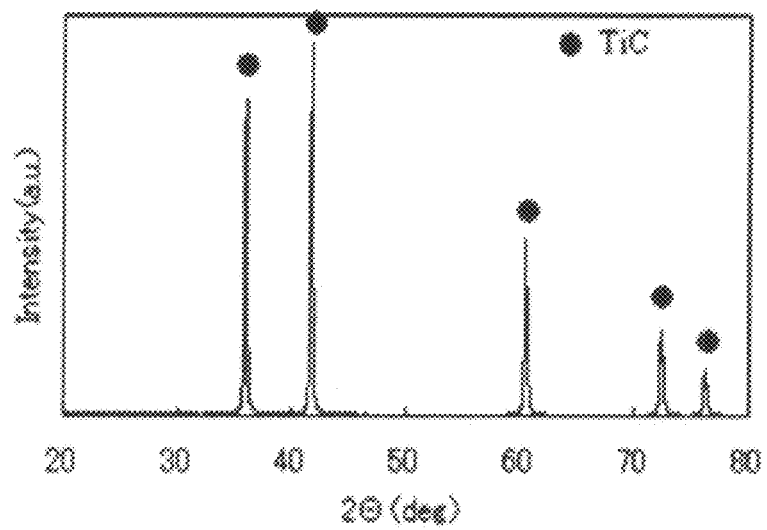
FIG. 1 is a graph showing an X-ray diffraction pattern of a titanium carbide powder produced by a method of the present invention.
Figure 2:
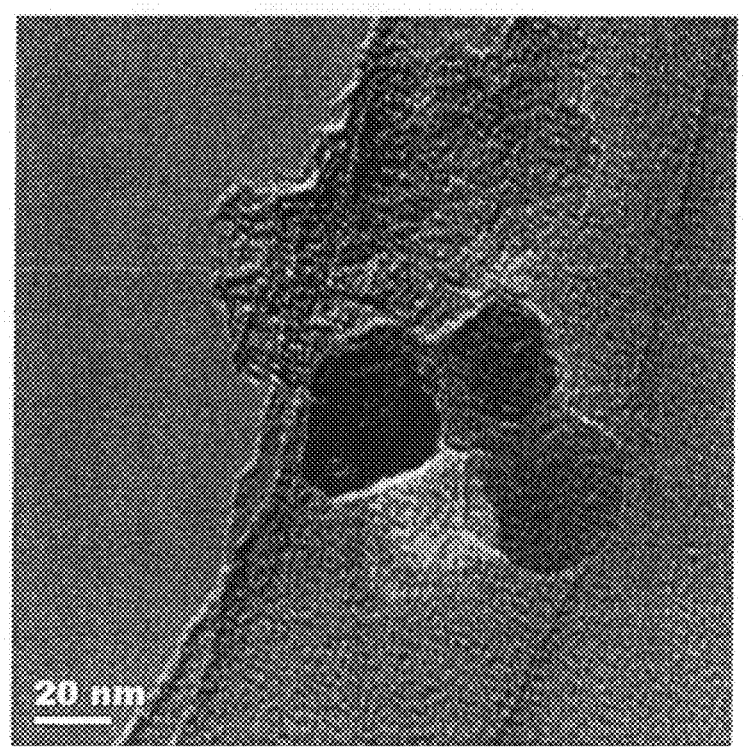
FIG. 2 is a transmission electron microscope photograph of a titanium carbide powder produced by a method of the present invention.
Figure 3:
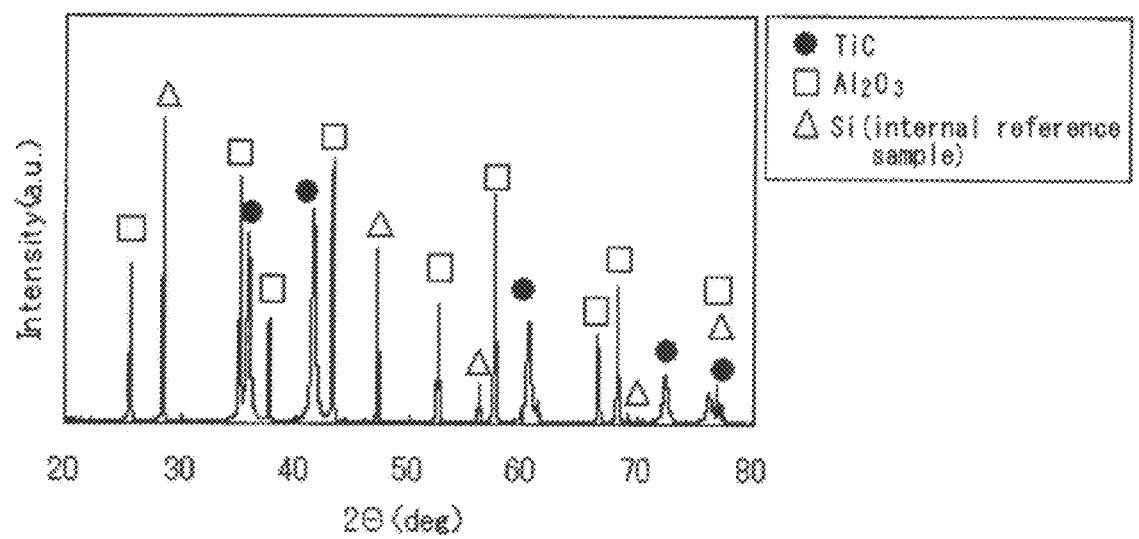
FIG. 3 is a graph showing an X-ray diffraction pattern of a titanium carbide-covered alumina powder produced by a method of the present invention.
Figure 4:
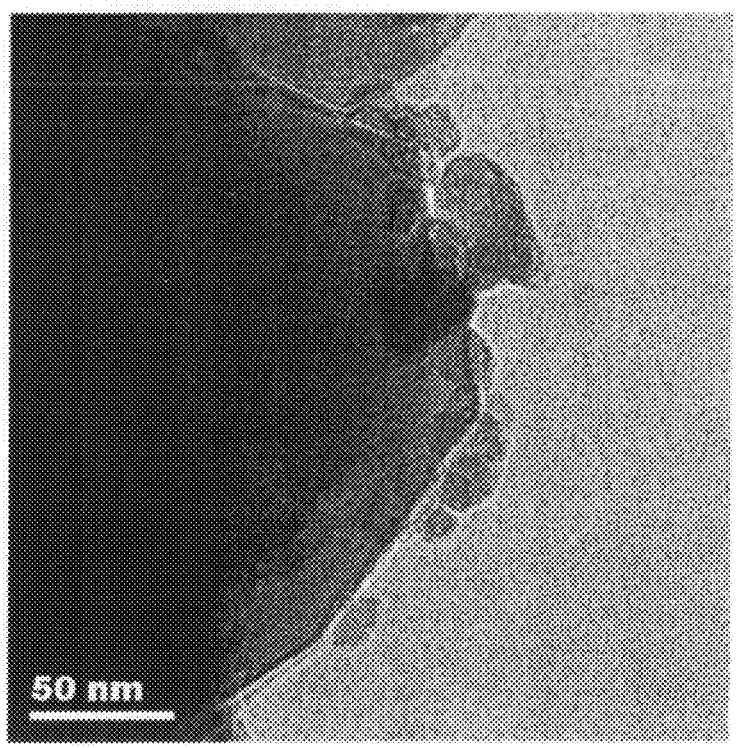
FIG. 4 is a transmission electron microscope photograph of a titanium carbide-covered alumina powder produced by a method of the present invention.
Figure 5:
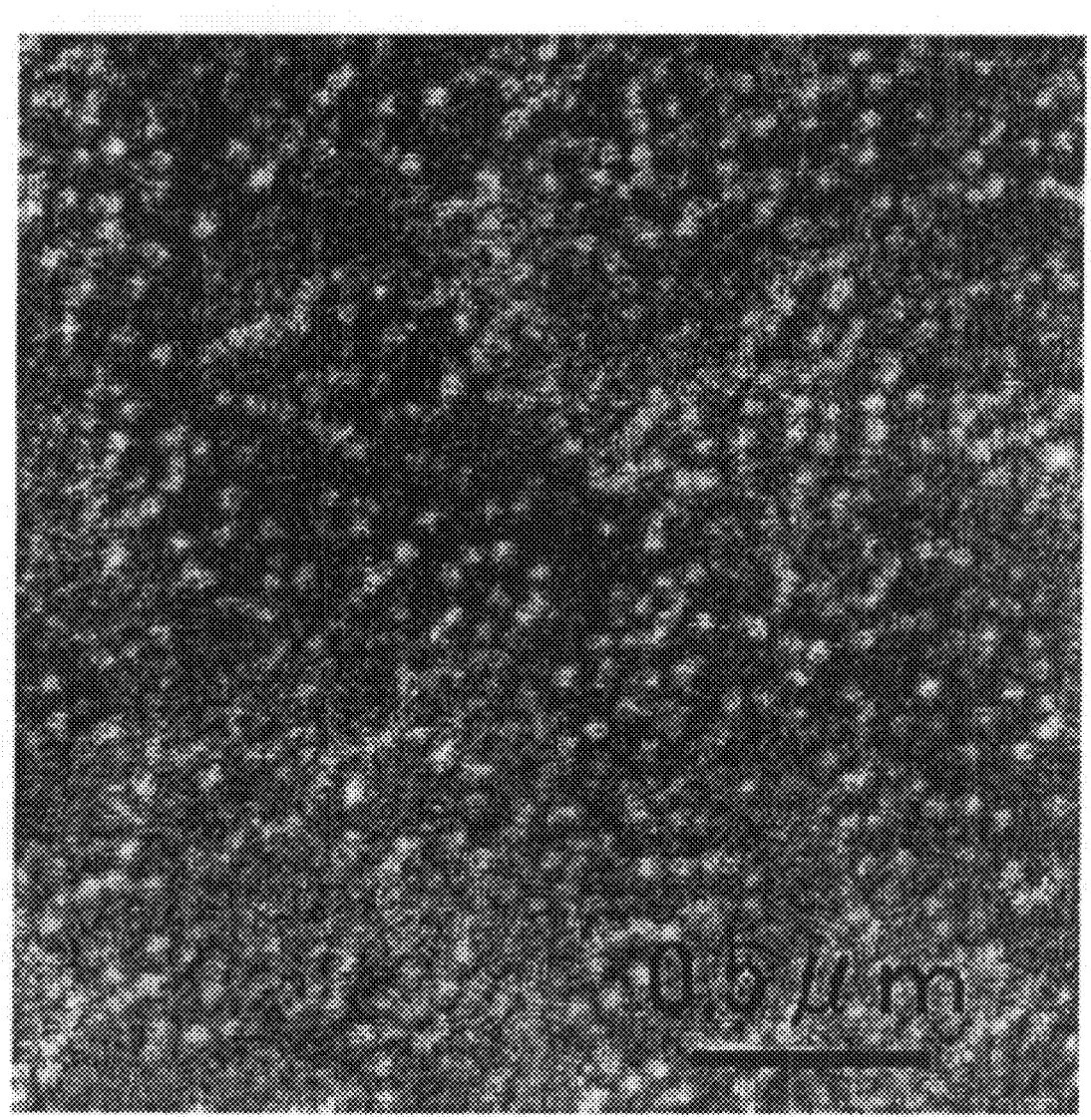
FIG. 5 is a scanning electron microscope photograph of a titanium carbide-alumina composite sintered body produced by a method of the present invention.

What is claimed is:

1. A method of producing a highly-pure fine titanium carbide powder comprising: highly-pure fine titanium carbide powder which includes a maximum particle size of 100 nm or less, said titanium powder including metals except titanium in an amount of 0.05 wt % or less and free carbon in an amount of 0.5 wt % or less; comprising the steps of;
dissolving an organic compound serving as a carbon source in a solvent to prepare a liquid, said organic compound containing at least one OH or COOH group which is a functional group coordinatable to titanium of titanium alkoxide, and no element except C, H, N and O;

mixing titanium alkoxide with said liquid to satisfy the following relation: $0.7 \leq \alpha \leq 1.0$ (wherein $\alpha$ is a molar ratio of said carbon source to said titanium alkoxide), so as to obtain a precursor solution;

solidifying said precursor solution to obtain a product; and subjecting said product to a heat treatment in a vacuum atmosphere at a temperature of 1050 to 1500° C.

2. The method according to claim 1, wherein said carbon source is a monomer selected from the group consisting of: phenols including phenol and catechol; organic acid including salicylic acid, phthalic acid, catechol and anhydrous citric acid; and EDTA.

3. The method according to claim 1, wherein said carbon source has two or more ligands, and a cyclic compound.

4. The method according to claim 1, wherein said carbon source in said product obtained in said solidifying is coordinated to titanium of said titanium alkoxide.

5. The method according to claim 1, wherein said titanium alkoxide is one selected from the group consisting of titanium (IV) methoxide, titanium (IV) ethoxide, titanium (IV) isopropoxide and titanium (IV) butoxide.

6. A method of producing a titanium carbide-ceramic composite powder comprising: highly-pure fine titanium carbide powder which includes a maximum particle size of 100 nm or less, said titanium powder including metals except titanium in an amount of 0.05 wt % or less and free carbon in an amount of 0.5 wt % or less, said titanium carbide-ceramic composite powder further comprising particles each having a core-shell structure in which a ceramic particle is covered with particles of the highly-pure fine titanium carbide powder; comprising the steps of:

dissolving an organic compound serving as a carbon source in a solvent to prepare a liquid;

mixing titanium alkoxide with said liquid to satisfy the following relation: $0.75 \leq \alpha \leq 1.1$ (wherein $\alpha$ is a molar ratio of said carbon source to said titanium alkoxide), so as to obtain a precursor solution;

mixing a ceramic powder with said precursor solution to slurry said precursor solution;

solidifying said slurried precursor solution to obtain a product; and subjecting said product to a heat treatment in a vacuum atmosphere at a temperature of 1050 to 1500° C.

7. The method according to claim 6, wherein said carbon source is a monomer selected from the group consisting of: phenols including phenol and catechol; organic acid including salicylic acid, phthalic acid, catechol and anhydrous citric acid; and EDTA.

8. The method according to claim 6, wherein said carbon source has two or more ligands, and a cyclic compound.

9. The method according to claim 6, wherein said carbon source in said product obtained in said solidifying step is coordinated to titanium of said titanium alkoxide.

10. The method according to claim 6, wherein said titanium alkoxide is one selected from the group consisting of titanium (IV) methoxide, titanium (IV) ethoxide, titanium (IV) isopropoxide and titanium (IV) butoxide.

11. The method according to claim 6, wherein said ceramic powder includes alumina.

12. A method of producing a titanium carbide-ceramic composite powder comprising: highly-pure fine titanium carbide powder which includes a maximum particle size of 100 nm or less, said titanium powder including metals except titanium in an amount of 0.05 wt % or less and free carbon in an amount of 0.5 wt % or less, said titanium carbide-ceramic composite powder further comprising a part of the high-pure and fine titanium carbide powders which cover a ceramic powder, and remaining titanium carbide powder particles are dispersed in a matrix of ceramic particles; comprising:

dissolving an organic compound serving as a carbon source in a solvent to prepare a liquid;

mixing titanium alkoxide with said liquid to satisfy the following relation: $0.75 \leq \alpha \leq 1.1$ (wherein $\alpha$ is a molar ratio of said carbon source to said titanium alkoxide), so as to obtain a precursor solution;

mixing a ceramic powder with said precursor solution to slurry said precursor solution;

solidifying said slurried precursor solution to obtain a product; and subjecting said product to a heat treatment in a vacuum atmosphere at a temperature of 1050 to 1500° C.

13. A method of producing a titanium carbide-ceramic composite powder comprising: highly-pure fine titanium carbide powder which includes a maximum particle size of 100 nm or less, said titanium powder including metals except titanium in an amount of 0.05 wt % or less and free carbon in an amount of 0.5 wt % or less, said titanium carbide-ceramic composite powder further comprising particles each having a core-shell structure in which an alumina particle is covered with particles of the highly-pure fine titanium carbide powder; comprising:

dissolving an organic compound serving as a carbon source in a solvent to prepare a liquid;

mixing titanium alkoxide with said liquid to satisfy the following relation: $0.75 \leq \alpha \leq 1.1$ (wherein $\alpha$ is a molar ratio of said carbon source to said titanium alkoxide), so as to obtain a precursor solution;

mixing a ceramic powder with said precursor solution to slurry said precursor solution;

solidifying said slurried precursor solution to obtain a product; and subjecting said product to a heat treatment in a vacuum atmosphere at a temperature of 1050 to 1500° C.

14. The method according to claim 12, wherein said carbon source his two or more ligands, and a cyclic compound.

15. The method according to claim 12, wherein said carbon source in said product obtained in said solidifying step is coordinated to titanium of said titanium alkoxide.

16. The method according to claim 12, wherein said titanium alkoxide is one selected from the group consisting of titanium (IV) methoxide, titanium (IV) ethoxide, titanium (IV) isopropoxide and titanium (IV) butoxide.

17. The method according to claim 12, wherein said ceramic powders includes alumina.

18. The method according to claim 13, wherein said carbon source has two or more ligands, and a cyclic compound.

19. The method according to claim 13, wherein said carbon source in said product obtained in said solidifying step is coordinated to titanium of said titanium alkoxide.

20. The method according to claim 13, wherein said titanium alkoxide is one selected from the group consisting of titanium (IV) methoxide, titanium (IV) ethoxide, titanium (IV) isopropoxide and titanium (IV) butoxide.

21. The method according to claim 13, wherein said ceramics powder includes alumina.

22. The method according to claim 12, wherein said carbon source is a monomer selected from the group consisting of: phenols including phenol and catechol; organic acid including salicylic acid, phthalic acid, catechol and anhydrous citric acid; and EDTA.

23. The method according to claim 13, wherein said carbon source is a monomer selected from the group consisting of:

phenols including phenol and catechol; organic acid including salicylic acid, phthalic acid, catechol and anhydrous citric acid; and EDTA.

24. The method according to claim 1, wherein said carbon source is a monomer having a molecular weight in the range of 94 to 292.

25. The method according to claim 6, wherein said carbon source is a monomer having, a molecular weight in the range of 94 to 292.

26. The method according to claim 12, wherein said carbon source is a monomer having a molecular weight in the range of 94 to 292.

27. The method according to claim 13, wherein said carbon source is a monomer having a molecular weight in the range of 94 to 292.

28. The method according to claim 1, wherein said carbon source is a monomer selected from salicylic acid and anhydrous citric acid.

29. The method according to claim 6, wherein said carbon source is a monomer selected from salicylic acid and anhydrous citric acid.

30. The method according to claim 12, wherein said carbon source is a monomer selected from salicylic acid and anhydrous citric acid.

31. The method according to claim 13, wherein said carbon source is a monomer selected from salicylic acid and anhydrous citric acid.

* * * * *